June 24, 1930.　　　S. G. RUSSELL　　　1,766,086
FISHING REEL
Filed Sept. 26, 1928　　2 Sheets-Sheet 2

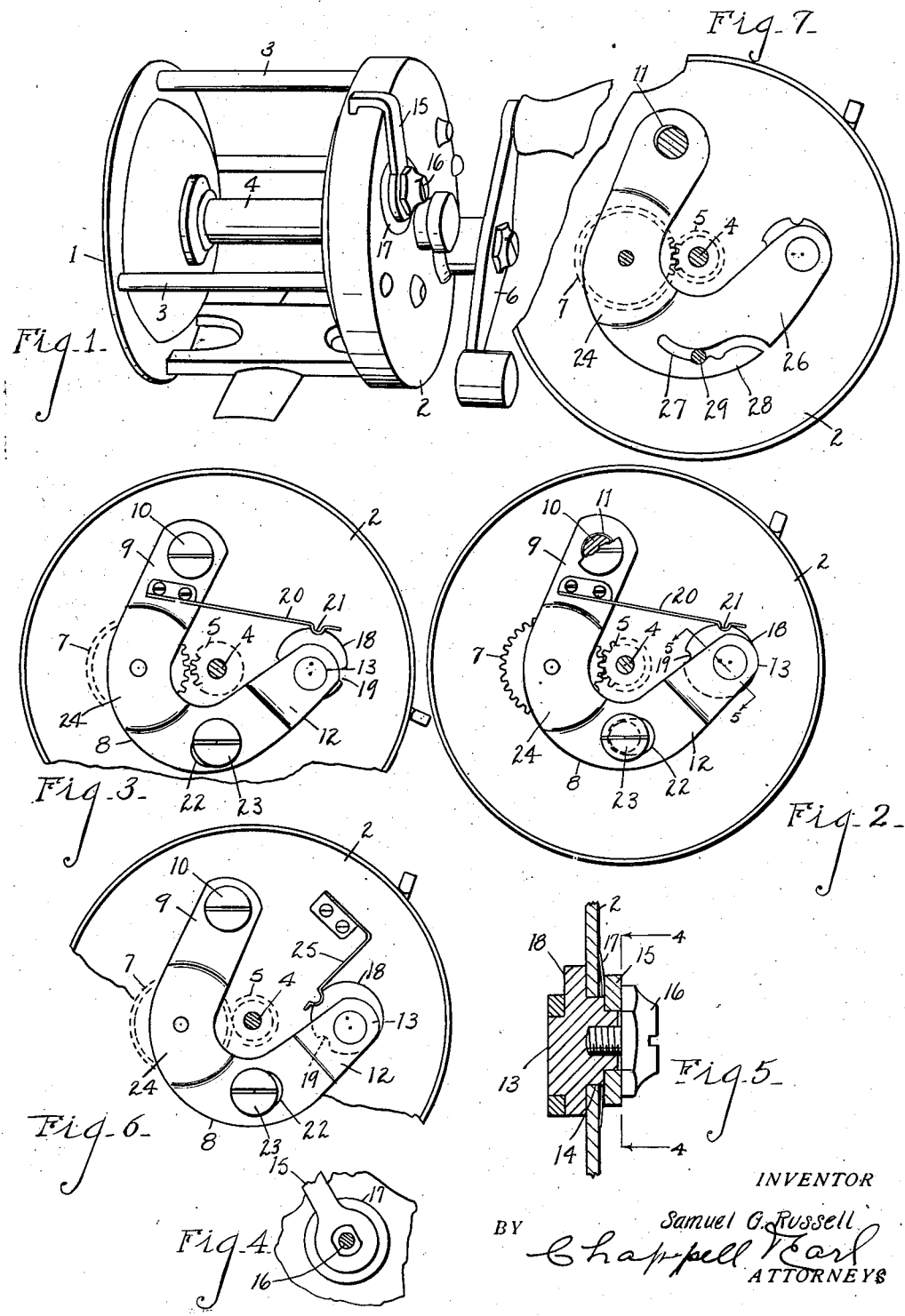

INVENTOR
Samuel G. Russell
BY Chappell & Earl
ATTORNEYS

Patented June 24, 1930

1,766,086

UNITED STATES PATENT OFFICE

SAMUEL G. RUSSELL, OF KALAMAZOO, MICHIGAN, ASSIGNOR TO SHAKESPEARE COMPANY, OF KALAMAZOO, MICHIGAN

FISHING REEL

Application filed September 26, 1928. Serial No. 308,444.

The main objects of this invention are:

First, to provide in a fishing reel of the free spool type an improved means for supporting and controlling the driving mechanism.

Second, to provide in a fishing reel of the free spool type an improved control means which is simple and durable in structure, and at the same time one in which the mechanism is very securely held in both its operative or spool driving position and free spool position.

Objects pertaining to details and economies of my invention will definitely appear from the description to follow. The invention is defined in the claims.

A structure embodying the features of my invention is clearly illustrated in the accompanying drawing in which:

Fig. 1 is a perspective view of a fishing reel embodying the features of my invention.

Fig. 2 is an inside view of the head member of the reel on which the control mechanism is mounted, the driving gear being shown in driving position.

Fig. 3 is a fragmentary view corresponding to that of Fig. 2 with the driving gear in disengaged position.

Fig. 4 is a detail view in section on line 4—4 of Fig. 5, showing details of the finger piece mounting.

Fig. 5 is an enlarged detail view mainly in section on line 5—5 of Fig. 2.

Fig. 6 is a fragmentary view corresponding to that of Fig. 2 of a slightly modified construction, the modification being in the mounting of the detent.

Fig. 7 is a fragmentary view partially in section showing another modification in which the spring detent is formed integrally with the driving gear support.

Figure 8:
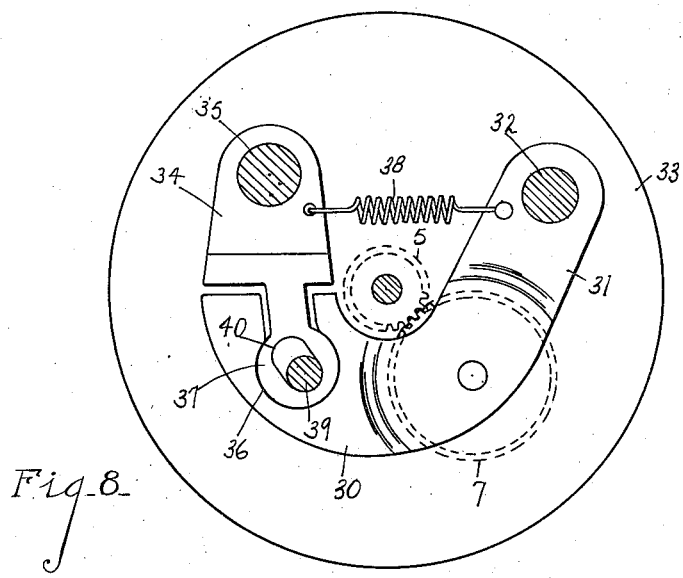
Fig. 8 is a detail section showing still another modification or adaptation of my invention.

Referring to the drawing, the reel frame comprises a tail plate 1 and head member 2 connected by pillars 3. As the details of the frame form no part of this invention they are not further illustrated herein.

The spool 4 is provided with a pinion 5 while the crank 6 is provided with a gear 7 coacting with the pinion. This gear 7 is mounted on a U-shaped support 8, the arm 9 of which is pivotally engaged with the pivot 10 carried by the head member 2. The hole 11 in the arm 9 is preferably somewhat larger than the pivot so that limited movement of the support on the pivot is permitted. The gear 7 is mounted on the support adjacent its bight. The other arm 12 of the support is engaged with the eccentric 13 which is rotatably mounted in an opening 14 in the head member 2.

The lever-like finger-piece 15 is secured on the outer end of the eccentric by means of the screw 16. A dished washer 17 is arranged between the finger-piece and the head member, this constituting a friction means and also a finishing member.

Thus arranged, when the eccentric is actuated the support is swung on its pivot to engage and disengage the gear. The eccentric has a keeper member 18 having spaced notches 19 therein to be engaged by the spring detent 20. This detent is in the form of a blade spring mounted on the arm 9 of the support and has an offset 21 therein adapted to engage in the recesses 19.

To further hold the support in position it is provided with a slot-like opening 22 through which the screw 23 is arranged, the head of the screw overlapping the support. The support is in practice formed as a stamping, the portion 24 being struck up to receive the gear 7. The end of the arm 12 is also struck up to overlie the keeper member 18 of the eccentric.

In the modification shown in Fig. 6 the spring 25 is mounted on the inner side of the head member 2. The embodiment shown in Fig. 2 is preferred, however, as the detent may be assembled on the support before the support is assembled on the head member.

Figure 9:
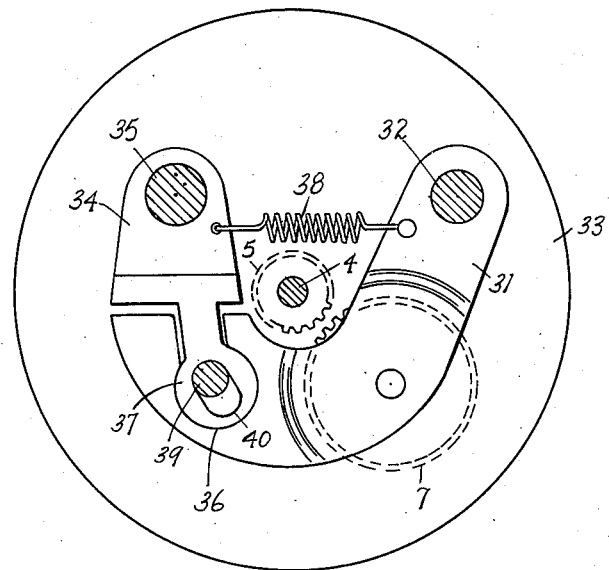
Fig. 9 is a detail section corresponding to Fig. 8 with the gear disconnected.

In the embodiment shown in Fig. 7 the support member 26 is slotted at 27 to provide an integral spring detent 28. This detent coacts with the pin-like keeper 29 on the head member 2. In the embodiment shown in Figs. 8 and 9 the support 30 is jointed, the section 31 being pivoted at 32 on the head member conventionally shown at 33, while the section 34 is engaged with the eccentric 35.

The section 31 is provided with a joint socket 36 which is engaged by the head member 37 on the section 34. The coiled spring 38 is connected to the section 31 adjacent its pivot, and to the section 34 adjacent the eccentric, the spring acting to yieldingly hold the support in both its actuated and released position. The stud 39 engages a slot 40 in the head 37 of the section 34, thus serving the purpose of the retaining screw or stud 23 in the embodiment shown in Fig. 2.

Fishing reels embodying my improvements are easily manipulated to engage and disengage the gear. The mechanism is simple and compact and at the same time very durable.

I have illustrated and described my improvements in several embodiments which I consider very practical. I have not attempted to illustrate or describe other embodiments which are possible as I believe this disclosure will enable those skilled in the art to embody or adapt my improvements as may be desired.

Having thus described my invention, what I claim as new and desire to secure by Letters Patent, is:

1. In a fishing reel, the combination with a frame comprising a head member, a spool provided with a pinion, a U-shaped support arranged to embrace said pinion and pivoted at the end of one arm to said head member, a driving gear mounted on said support in coacting relation with said pinion, an eccentric rotatably mounted on said head member and provided with a finger piece, said eccentric being engaged with the other arm of said support whereby when the eccentric is actuated the support is shifted on its pivot, said eccentric being provided with a keeper member having spaced notches, and a spring detent mounted on the pivoted end of said support to coact with said keeper member.

2. In a fishing reel, the combination with a frame comprising a head member, a spool provided with a pinion, a U-shaped support arranged to embrace said pinion and pivoted at the end of one arm to said head member, a driving gear mounted on said support in coacting relation with said pinion, an eccentric rotatably mounted on said head member and provided with a finger piece, said eccentric being engaged with the other arm of said support whereby when the eccentric is actuated the support is shifted on its pivot, said eccentric being provided with a keeper member having spaced notches, and a spring detent coacting with said keeper member.

3. In a fishing reel, the combination with a frame, a spool provided with a pinion, a U-shaped support arranged to embrace said pinion, one arm of said support being pivotally mounted on said frame, a driving gear mounted on said support in coacting relation to said pinion, an actuating eccentric rotatably mounted on said frame in engagement with the other arm of said support, and a spring means acting to hold said support in its adjusted positions.

In witness whereof I have hereunto set my hand.

SAMUEL G. RUSSELL.